(12) United States Patent
Moote

(10) Patent No.: US 7,920,557 B2
(45) Date of Patent: Apr. 5, 2011

(54) APPARATUS AND METHOD FOR SOFT MEDIA PROCESSING WITHIN A ROUTING SWITCHER

(75) Inventor: Stanley Robert Moote, Toronto (CA)

(73) Assignee: Harris Corporation, Melbourne, FL (US)

( * ) Notice: Subject to any disclaimer, the term of this patent is extended or adjusted under 35 U.S.C. 154(b) by 721 days.

(21) Appl. No.: 11/675,519

(22) Filed: Feb. 15, 2007

(65) Prior Publication Data

US 2008/0198838 A1    Aug. 21, 2008

(51) Int. Cl.
    *H04L 12/28* (2006.01)
(52) U.S. Cl. ......... 370/389; 370/400; 370/419; 709/238
(58) Field of Classification Search .................. None
    See application file for complete search history.

(56) References Cited

U.S. PATENT DOCUMENTS

| | | | |
|---|---|---|---|
| 5,051,845 A | 9/1991 | Gardner | |
| 5,396,618 A | 3/1995 | Fukui | |
| 5,440,721 A | 8/1995 | Morgan | |
| 5,812,185 A | 9/1998 | Mizuno | |
| 5,874,910 A | 2/1999 | Cooper | |
| 5,982,456 A | 11/1999 | Smith, Jr. | |
| 6,009,228 A | 12/1999 | Fujita | |
| 6,130,725 A | 10/2000 | Liron | |
| 6,785,887 B2 * | 8/2004 | Armstrong et al. | 718/100 |
| 7,013,361 B2 | 3/2006 | Liron | |
| 7,283,538 B2 | 10/2007 | Pham et al. | |
| 2002/0083467 A1 | 6/2002 | Albright | |
| 2003/0074388 A1 * | 4/2003 | Pham et al. | 709/106 |
| 2004/0208163 A1 * | 10/2004 | Patel et al. | 370/351 |

FOREIGN PATENT DOCUMENTS

| | | |
|---|---|---|
| EP | 0944288 A2 | 9/1999 |
| WO | 0167694 A1 | 9/2001 |

OTHER PUBLICATIONS

International Searching Authority, International Search Report for International application No. PCT/US08/53896 (counterpart foreign application), Date of Mailing: Jun. 12, 2008, Form PCT/ISA/220 & Form PCT/ISA/210 (sheet one and sheet two).

* cited by examiner

*Primary Examiner* — Bob A Phunkulh
(74) *Attorney, Agent, or Firm* — Duane Morris LLP

(57) ABSTRACT

A routing switcher performs various soft signaling processing within the router using one or more internal soft media processors (central processing units) to enable flexible solutions. The routing switcher includes a plurality of inputs and outputs operably connected by a cross-point matrix where the inputs are dynamically coupled to one or more of the outputs. The routing switcher also includes a soft media processor connected to the cross-point matrix as well as being dynamically coupled between some inputs and outputs. The soft media processor receives a signal from an input via the cross-point matrix and performs one of at least two signaling processing functions resident on the soft media processor and outputs a processed signal from one or more of the routing switcher's outputs.

31 Claims, 3 Drawing Sheets

APPARATUS AND METHOD FOR SOFT MEDIA PROCESSING WITHIN A ROUTING SWITCHER

BACKGROUND

Signal routers, also known as non-blocking routers, are used to switch signals on any one or more input channels to one or more output channels. Typically, such signal routers have a matrix of cross-point switches for selectively connecting the input channels with the output channels. In some signal routers these cross-point switches are configured manually.

Some routing switchers use computer or processor controlled switching functions in which software generates control signals for operation of the cross-point switches in response to the selection of source and destination.

Most of the source and destination devices connected to routers have multiple signals, thus a video camera can may have four video channels and left and right audio channels, and a VCR may have a video channel and two audio channels. Conventionally, routing switches have been provided in broadcasting stations to control switching of input/output routes for signals. After video signals and audio signals from signal sources have been fetched through arbitrary input lines, they are provided to respective receiving units on the editor side through specified arbitrary output lines, such that editing operations on the video signals and the audio signals are performed in the respective receiving units.

More specifically, the routing switch is a matrix-shaped input/output switching apparatus, formed of a collection of cross-points, at which input lines and output lines intersect with each other, in order to deliver external video signals and audio signals from arbitrary input lines to arbitrary output lines. By setting an input line for each column in the matrix and setting an output line for each row, an input signal on a specified input line is provided from the specified output line through a specified cross-point.

As illustrated in FIG. 1, a routing switcher 100 has input lines $I_1$-$I_n$ 110 on the IN side and output lines $O_1$-$O_m$ 120 on the OUT side are arranged in a matrix form, such that signals are provided from specified input lines to specified output lines through cross-points 130 at which the input lines $I_1$-$I_n$ and the output lines $O_1$-$O_m$ intersect with each other.

Also, the routing switcher is capable of providing a signal from a single output line or up to m output lines arbitrarily selected from the plurality of output lines $O_1$-$O_m$, thus providing a versatility which enables arbitrary signals to be output simultaneously from all of the output lines $O_1$-$O_m$ or only from specified predetermined output lines.

A wide range of signal processing functions are typically applied to signals on transmission and receipt. Traditionally, any signal processing is handled outside of the routing switcher. For example if a signal required noise reduction, the routing switcher would be configured to receive the signal at an input port and transmit the signal at a output port connected to a signal processor for noise reduction. The signal processor would then provide the processed signal to another input port which would be connected to another output port associated with the signal's destination.

Other signal processing configurations are serial to the destination devices, such that if a signal required noise reduction, the signal processor would be serially aligned with the signal's destination. For example, a signal would be received at an input port connected to an output port associated with the destination and would be operated on by a dedicated signal processing device outside of the routing switch before directly arriving at the destination device.

There are many disadvantages associated with signal processing outside of the routing switcher in the scenarios described above. For example, multiple inputs and outputs are occupied for a signal needing processors, and each must be configured. Additionally, where serial processing is used, the processing device resources cannot be shared or reallocated to other inputs not sharing the same destination device.

In order to obviate the deficiencies of the prior art, it is an object of the present subject matter to present a media routing switch with integrated signal processing. The routing switch includes a plurality of inputs and a plurality of outputs connected by a cross-point matrix. The routing switch also includes a central processing unit connected to the cross-point matrix and dynamically coupled between one or more of the inputs and one or more of outputs. The central processor receives a first signal from an input via the cross-point matrix and perform one of at least two signal processing functions on the received signal and outputs a processed signal.

It is also an object of the present subject matter to present a method of routing audio visual signals. The method includes dynamically assigning a plurality of inputs to a plurality of outputs and to one or more central processing unit inputs, and dynamically assigning one or more central processing unit outputs to the one or more of the plurality of outputs. The method further includes dynamically selecting one of at least two processing functions; and processing a signal associated with the one or more central processing unit inputs with the selected processing function and outputting the processed signal at the one or more central processing unit outputs.

These objects and others obviate the deficiencies of the prior art by placing various soft signal processing within the router to enable flexible solutions.

These objects and other advantages of the disclosed subject matter will be readily apparent to one skilled in the art to which the disclosure pertains from a perusal of the claims, the appended drawings, and the following detailed description of the preferred embodiments.

DETAILED DESCRIPTION

Figure 1:
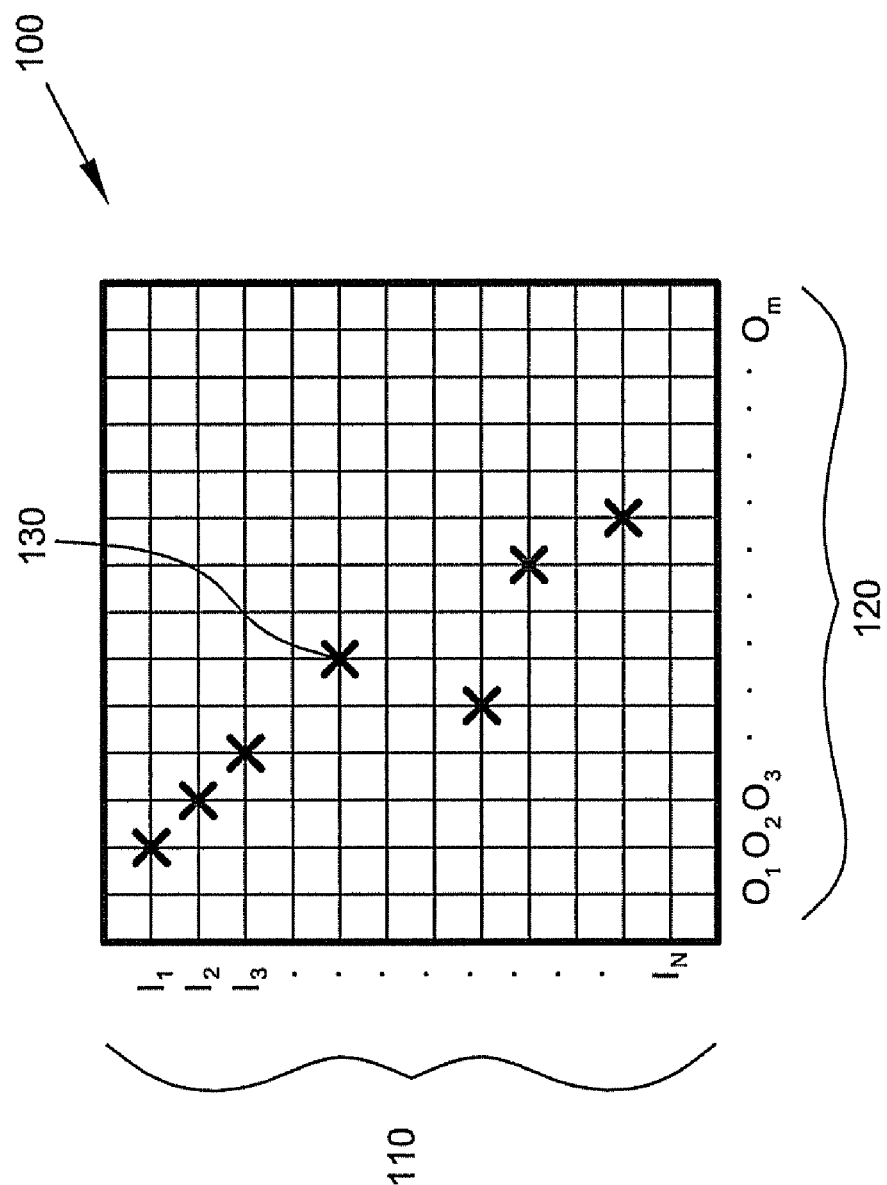
FIG. 1 is a prior art routing switch.
Figure 2:
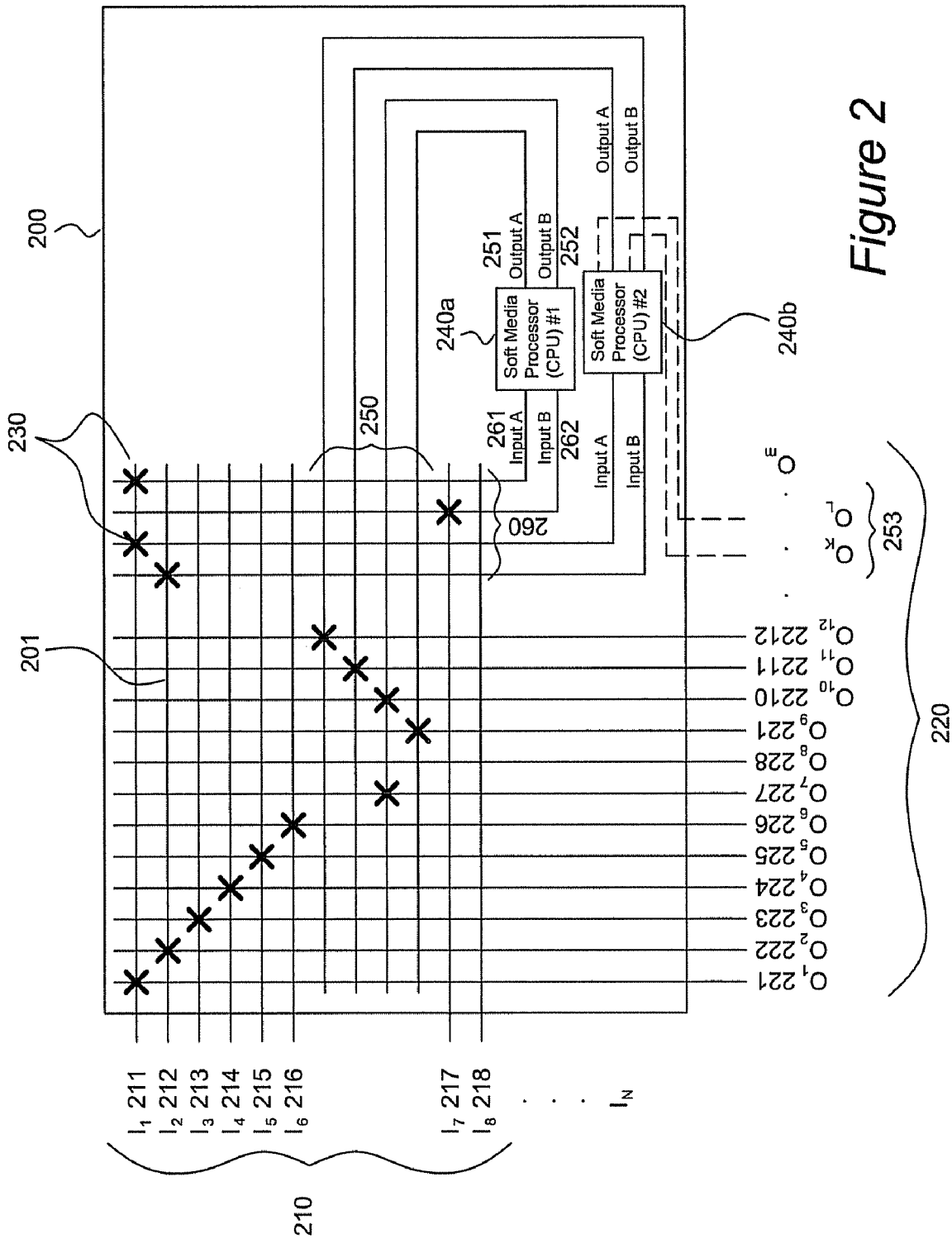
FIG. 2 is a representation of a routing switch with integral processing functions according to an embodiment of the present subject matter.

FIG. 2 is a representation of an audio/video ("AV") routing switcher with integral soft CPU based processing. The AV router includes a cross-point matrix. The cross-point matrix includes a plurality of inputs ($I_1$ (211), $I_2$ (212), $I_3$ (213) . . . $I_n$ (21n)). While the router in FIG. 2 shows eight inputs, router inputs typically range from 4-1000 and the use of eight inputs is exemplary only and is not intended to limit the scope of the claims appended herewith. The cross-point matrix also includes a plurality of outputs ($O_1$ (221), $O_2$ (222), $O_3$ (223) . . . $O_m$ (22m)). While the router in FIG. 2 shows twelve outputs, this again is only exemplary and is not intended to limit the scope of the claims appended herewith. In addition, the ratio of inputs to outputs is exemplary only; other ratios are equally envisioned. The inputs 210 and outputs 220 are typically in the form of pins, or ports. The inputs 210 and outputs 220 are connected by the cross-point matrix 201 via cross-point connections, collectively 230. For simplicity these connections are shown as bulleted intersections.

The AV router in FIG. 2 includes two soft media processors (SMP), or CPUs, SMP#1 240a and SMP#2 240b. The SMPs (collectively, 240) are integral with the router and connect to the cross-point matrix 201. The SMPs 240 are configured to perform at least two signal processing function. The SMPs 240 have two inputs and two outputs each, however, they may include any number of inputs and outputs with only practicality as a limit. In addition the SMPs 240 may also include one or more direct outputs 253 that do not feed back into the cross-point matrix 201, such a direct output 253, shown as $O_k$, $O_L$, could be used with a monitor. The number of processing functions capable of being performed by the SMPs 240 is vast, these processing functions include, but are not limited to noise reduction, color correction, mixing, graphics insertion, compression (encoding/decoding) aspect ratio conversion, video, audio gain, offset adjustment, color space conversion, embedded data grooming (audio, metadata), digital video code protection, audio sample rate conversion, genlock, frame synchronization, audio synchronization, gamut protection, osd menuing, film cadence; detection/handling/generation, edge shaping, chroma coring, base signal generation, detail enhancement, sin(x)/x correction, slope equalization, band limiting (brick-wall), chroma modulation, demodulation, ts grooming, stat muxing, re-time stamping, quant table adjustment ("AGV"), re-rating (mpeg), de-interlacing, chroma-luma separation, quantization, motion estimation, dct compression, wavelet compression, forward error correction, audio compression, clipping, gamut correction, audio/video muxing, audio/video de-muxing, stream muxing, scaling, positioning, source ID, re-phasing, delay compensation, picture overlays, voice overs, audio mixing, video mixing, video effects, keying, transcoding, rate conversion, format conversion, scan rate conversion, anti-aliasing, performance metering/measurements, compliance checking/correction, error detection/correction, meta-data syncing, meta-data mux/demux and stream management. Although the list of processing functions above is lengthy it is by no means exhaustive and the present subject matter is not limited to only those listed. the SMPs 240 may maintain the software required for the processing on a resident memory internal to the SMPs 240 or an associated memory also internal to the routing switch; as such the SMPs are reprogrammable.

In alternative embodiments, the SMPs 240 perform diagnostics or self discovery on the signals to determine which processing function to apply. The diagnostic functions may be one of the several signal processing functions associated with the SMPs 240. For self discovery, the SMPs 240 may sample input signals, upon detecting one or more predetermined formats, the SMPs 240 selects an appropriate processing function to translate the protocol into another predetermined protocol. The SMPs 240 may also provide instructions for configuring the cross-point matrix based upon the diagnosis and self discovery. For example, if the output from the SMPs 240 was connected to an HDTV mixer, but the input received into the router 200 was detected as SD, the SMP would select a processing function to de-interlace, up convert and reformat the SD video input for HDTV.

The SMPs 240 in FIG. 2 are connected to the cross-point matrix through internal inputs, collectively 260, and internal outputs collectively 250, and thus are configurable through the cross-point matrix to receive signals from the any of the inputs 210 via the cross-point matrix 201. After performing one of the at least two signal processing functions on the signal, the SMPs 240 are configurable to output signals to any of the outputs 220 via the cross-point matrix 201, or as discussed previously output directly over one or more direct outputs 253 ($O_k$, $O_L$).

SMP 240a, as shown, has two inputs 261 and 262 and two outputs 251 and 252. The SMP 240a may perform the same processing function on both the input signals from 261 and 262 or may perform different processing functions, such as color correction and noise reduction as shown in FIG. 2. The SMPs 240 may also combine signals of two or more inputs, where the processing functions may or may not be different. For example, inputs $I_1$ 211 and $I_2$ 212 as shown in FIG. 2 are processed and combined in SMP 240 and output from the cross-point matrix at $O_{12}$ 2212. Noise reduction may be performed on both the signals from 211 and $I_2$ 212 or noise reduction may be performed on the signal from $I_1$ 211 while color correction processing may be performed on the signal from $I_2$ 212.

Additionally, the signals processed by the SMPs 240 may be broadcast to multiple outputs. For example, the SMP 240a performs color correction processing on the signal provided by $I_7$ 217. This processed signal is then provided to multiple outputs, specifically as shown, $O_7$ 227 and $O_{10}$ 2210. Furthermore, the processing functions may be cascaded such that a first of the multiple processing functions of the SMPs 240 is performed on an input signal and returned to the cross-point matrix 201 which is then provided to the SMPs 240 for performing another of the processing functions before transmitting the processed signal from the routing switch 200. In addition, signal division may be performed in the SMPs 240. For example, an input with a composite signal may be divided by the SMPs and each component (e.g., audio and video) may be provided on separate outputs.

Table 1 shows an exemplary routing and processing operation for the routing switch 200 shown in FIG. 2.

TABLE 1

| Router Switch Outputs 220 | Router Switch Inputs 210 |
|---|---|
| $O_1$ (221) | $I_1$ (211) |
| $O_2$ (222) | $I_2$ (212) |
| $O_3$ (223) | $I_3$ (213) |
| $O_4$ (224) | $I_4$ (214) |
| $O_5$ (225) | $I_5$ (215) |
| $O_6$ (226) | $I_6$ (216) |
| $O_7$ (227) | $I_7$ (217) via SMP 240a (input b, output b) providing color correction processing. |
| $O_8$ (228) | NC |
| $O_9$ (229) | $I_1$ (211) via SMP 240a (input a, output a) providing noise reduction noise reduction processing. |
| $O_{10}$ (2210) | $I_7$ (217) via SMP 240a (input b, output b) providing color correction processing. |
| $O_{11}$ (2211) | $I_2$ (212) via SMP 240b (input b, output a) providing graphics insertion and voice over from $I_1$ |
| $O_{12}$ (2212) | $I_1$ (211) and $I_2$ (212) via SMP 240b (input a and b, output b) combining a mix of $I_1$ & $I_2$. |

As illustrated in Table 1, the outputs $O_{1-6}$ are connected directly via the cross-point matrix 201 to inputs $I_{1-6}$ much as would a conventional routing switch would operate. $O_7$ is the output from SMP 240a after performing color correction on the signal input from $I_7$. In the example in FIG. 2, $O_8$ is not connected ("NC") to any of the SMP inputs or the SMP outputs. $O_9$ is the output from SMP 240a after performing noise reduction on the signal input from $I_1$. O10 is the output from SMP 240a after performing color correction on the signal input from $I_7$. $O_{11}$ is the output from SMP 240b after performing graphic insertion and voice over on the signal input from $I_2$. $O_{12}$ is the output from SMP 240b after combining the signals input from $I_1$ and $I_2$. Again the routing illustrated in Table 1 is exemplary for illustration only and is not intended to limit the scope of the claims appended herewith.

Figure 3:
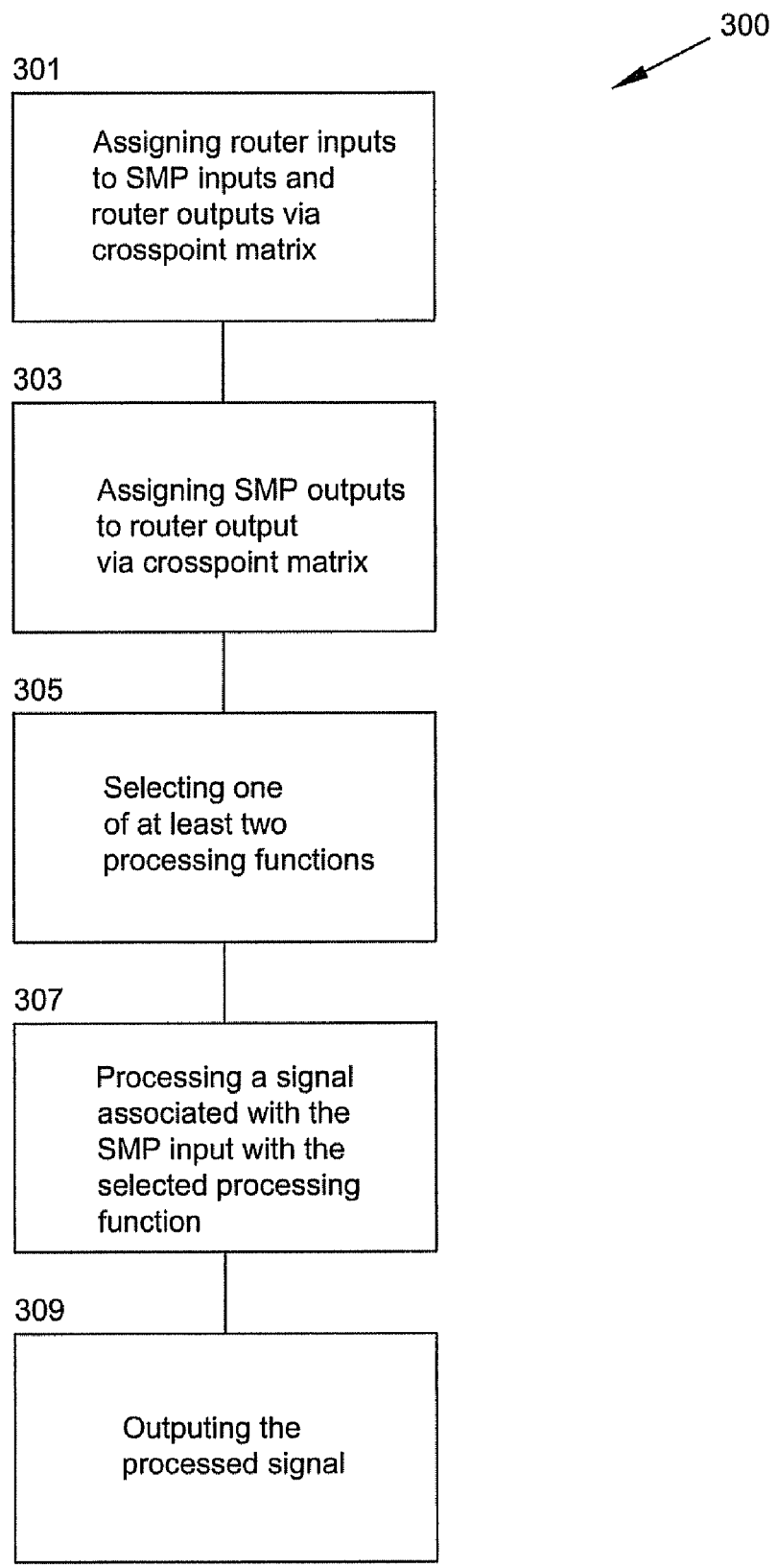
FIG. 3 is a representative flow chart for a method of media routing according to an embodiment of the present subject matter.

With reference to FIG. 3, a flow chart 300 for routing audio visual signals is illustrated. In the routing switch 200, the inputs 210 are assigned through the cross-point matrix 201 to SMP inputs 260 and outputs 220 as shown in block 301. In a similar fashion, the SMP outputs 250 are assigned to router outputs 220 via the cross-point matrix as shown in block 303. A processing function is selected from the processing functions available on the SMPs 240 as shown in Block 305. This selection may be predetermined based on the assigned input, type of signal, or dynamically selected based on the characteristics of the input signal. The SMP performs the selected processing function on the signal received at its SMP input as shown in Block 207, and then provides the processed signal through the cross-point matrix 201 and to the assigned router output 220 as shown in Block 309.

A further aspect of the present subject matter incorporates multiple processing functions into a cross-point matrix router. Another aspect of the present subject matter incorporates parallel processing of multiple signals within the routing switch. Still another aspect of the present subject matter incorporates parallel processing of multiple signals using different processing function within the routing switch.

Yet another aspect of the present subject matter allows for selective allocation of processing resources within the routing switch. The SMPs may dynamically change from one input to another and may dynamically change from one processing function to another.

The present subject matter reduces end user cost by internalizing processing function within the router switch thus reducing the need for dedicated serial processing. The subject matter also facilitates flexibility with the use of soft media processing within the router that can be changed with substitution of software, whereas current routers require outside devices which are dedicated to hardware and software combinations. The subject matter also simplifies signal flow by performing signal processing within the router switch.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What is claimed:

1. A media routing switch comprising:
    a plurality of inputs and a plurality of outputs operably connected by a cross-point matrix, wherein at least one of the inputs is dynamically coupled to one or more of the plurality of outputs;
    a central processing unit operably connected to the cross-point matrix and dynamically coupled between at least one of the inputs and one or more of the plurality of outputs; the central processing unit programmed to perform at least two independently selectable processing functions;
    wherein, the central processing unit is configured to receive a first signal from the at least one input via the cross-point matrix and perform one of the at least two signal processing functions on the first received signal and output a first processed signal.

2. The media routing switch according to claim 1, wherein the central processing unit is dynamically coupled between a second one of the plurality of inputs and a second one or more of the plurality of outputs via the cross-point matrix and configured to receive a second signal and performs another of said two processing functions on the second signal and outputs a processed second signal to the second one or more of the plurality of outputs.

3. The media routing switch according to claim 1, wherein the at least two processing functions are selected from the group consisting of noise reduction, color correction, compression, and graphics insertion.

4. The media routing switch according to claim 1, wherein the central processing unit is dynamically coupled between a second one of the plurality of inputs and a second one or more of the plurality of outputs via the cross-point matrix and configured to receive a second signal from the second input and perform said one processing function on the second signal and output a processed second signal to the second one or more of the plurality of outputs.

5. The media routing switch according to claim 1, central processing unit is dynamically coupled between a second one of the plurality of inputs and a second one or more of the plurality of outputs via the cross-point matrix and configured to receive a second signal from the second input and perform said one processing function on the second signal and output a processed second signal to the second one or more of the plurality of outputs.

6. The media routing switch according to claim 1, wherein the central processing unit is dynamically coupled between a second input and the one or more of the plurality of outputs and performs a second one of the at least two signal processing functions on a second signal received from the second input and generates a combined signal from the first processed received signal and a processed second signal and outputs the combined signal to the one or more of the plurality of outputs.

7. The media routing switch according to claim 1, comprising a second central processing unit operably connected to the cross-point matrix, wherein the second central processing unit is configured to receive a second signal from the cross-point matrix and perform one of at least two second signal processing functions on the received second signal and outputting the processed second signal to one or more of the plurality of outputs via the cross-point matrix.

8. The media routing switch according to claim 7, wherein the at least two second signal processing functions are the same as the at least two signal processing functions.

9. The media routing switch according to claim 7, wherein the at least two second signal processing functions are different from the at least two signal processing functions.

10. The media routing switch according to claim 7, wherein the received second signal is the processed signal from the central processing unit.

11. The media routing switch according to claim 1, wherein the central processing unit is programmable.

12. The media routing switch according to claim 1, wherein the central processing unit is dynamically configured to receive the first processed signal via the cross-point matrix and performs another of said at least two processing functions on the first processed signal and outputs a second processed signal to the one or more of the plurality of outputs.

13. The media routing switch according to claim 1, wherein the first processed signal is output to the one or more of the plurality of outputs via the cross-point matrix.

14. The media routing switch according to claim 1, wherein one of the at least two processing functions is determining at least one input needing signal processing and dynamically selecting another of the at least two processing functions based on the determination and wherein others of the at least two processing functions are selected from the group consisting of noise reduction, color correction, mixing, graphics insertion, compression, aspect ratio conversion, video, audio gain, offset adjustment, color space conversion, embedded data grooming, digital video code protection, audio sample rate conversion, genlock, frame synchronization, audio synchronization, gamut protection, osd menuing, film cadence; detection-handling-generation, edge shaping, chroma coring, base signal generation, detail enhancement, sin(x)/x correction, slope equalization, band limiting, chroma modulation, demodulation, ts grooming, stat muxing, re-time stamping, quant table adjustment, re-rating, color correction, de-interlacing, chroma-luma separation, quantization, motion estimation, and dct compression.

15. The media routing switch according to claim 1, wherein the at least two processing functions are selected from the group consisting of wavelet compression, forward error correction, audio compression, clipping, gamut correction, audio/video muxing, audio/video de-muxing, stream muxing, scaling, positioning, source ID, re-phasing, delay compensation, graphics insertion, picture overlays, voice overs, audio mixing, video mixing, video effects, keying, transcoding, rate conversion, format conversion, scan rate conversion, anti-aliasing, performance metering/measurements, compliance checking/correction, error detection/correction, meta-data syncing, meta-data mux/demux and stream management.

16. The media routing switch according to claim 1, wherein one of the at least two processing functions is a detection function and another one of the at least two processing function is selected based on the detection function.

17. A method of routing signals comprising:
dynamically assigning a plurality of inputs to a plurality of outputs and to one or more central processing unit inputs via a cross-point matrix;
dynamically assigning one or more central processing unit outputs to one or more of the plurality of outputs via the cross-point matrix;
dynamically selecting one of at least two processing functions resident on the central processing unit;
in the central processing unit, processing a first signal associated with the one or more central processing unit inputs with the selected processing function and outputting the processed first signal.

18. The method according to claim 17, when the at least two processing functions are selected from the group consisting of noise reduction, color correction, compression, and graphics insertion.

19. The method according to claim 17, comprising dynamically selecting another one of the at least two processing functions and processing a second signal associated with another of the one or more central processing unit inputs with the selected another of the processing functions and outputting the processed second signal at the one or more central processor unit's outputs.

20. The method according to claim 17, comprising reception of a second signal on a second central processing unit input from a second input and combining the second signal with the first signal and providing a combined signal at one or more of the central processing unit's outputs.

21. The method according to claim 17, comprising replicating the output of one or more central processing outputs to another of the one or more central processing unit outputs.

22. The method according to claim 17, comprising in a second central processing unit, processing of a second signal from a second input with at least one of at least two second processing functions and outputting the processed second signal at the one or more central processing unit outputs.

23. The method according to claim 22, wherein the at least two second processing functions are the same as the at least two processing functions.

24. The method according to claim 22, wherein the at least two second processing functions are different from the at least two processing functions.

25. The method according to claim 17, further comprising determining the inputs needing signal processing and dynamically selecting the function based on the determination, wherein determining the inputs needing signal processing is one of the at least two processing functions.

26. The method according to claim 25, dynamically assigning the plurality of inputs to the plurality of outputs and the one or more central processing unit inputs based on the determination.

27. The method according to claim 17, wherein the first processed signal is output to the one or more of the plurality of outputs via the cross-point matrix.

28. The method according to claim 17, wherein the signal is an audio visual signal.

29. The method according to claim 17, when the at least two processing functions are selected from the group consisting of noise reduction, color correction, mixing, graphics insertion, compression, aspect ratio conversion, video, audio gain, offset adjustment, color space conversion, embedded data grooming, digital video code protection, audio sample rate conversion, genlock, frame synchronization, audio synchronization, gamut protection, osd menuing, film cadence; detection-handling-generation, edge shaping, chroma coring, base signal generation, detail enhancement, sin(x)/x correction, slope equalization, band limiting, chroma modulation, demodulation, ts grooming, stat muxing, re-time stamping, quant table adjustment, re-rating, color correction, de-interlacing, chroma-luma separation, quantization, motion estimation, and dct compression.

30. The method according to claim 17, when the at least two processing functions are selected from the group consisting of wavelet compression, forward error correction, audio compression, clipping, gamut correction, audio/video muxing, audio/video de-muxing, stream muxing, scaling, positioning, source ID, re-phasing, delay compensation, graphics insertion, picture overlays, voice overs, audio mixing, video mixing, video effects, keying, transcoding, rate conversion, format conversion, scan rate conversion, anti-aliasing, performance metering/measurements, compliance checking/correction, error detection/correction, meta-data syncing, meta-data mux/demux and stream management.

31. The method according to claim 17, wherein dynamically selecting one of at least two processing function is based on a detection function of another of the at least two processing functions.

* * * * *